United States Patent Office 3,772,245
Patented Nov. 13, 1973

3,772,245
POLYOLEFINS STABILIZED WITH ORGANIC HYDRAZINE COMPOUNDS AND PHENOLIC ANTIOXIDANTS
Martin Dexter, Briarcliff Manor, N.Y., assignor to Ciba-Geigy Corporation, Ardsley, N.Y.
No Drawing. Continuation-in-part of application Ser. No. 28,048, Apr. 13, 1970, which is a continuation-in-part of application Ser. No. 811,664, Mar. 28, 1969. This appplication Mar. 8, 1972, Ser. No. 232,959
Int. Cl. C08f 45/58
U.S. Cl. 260—45.85 N                    15 Claims

ABSTRACT OF THE DISCLOSURE

Alkylhydroxyphenylalkanoylhydrazines or alkylhydroxybenzoylhydrazines and phenolic antioxidants stabilized olefin polymers in the presence of metals.

This application is a continuation-in-part of application Ser. No. 28,048, filed Apr. 13, 1970, now U.S. Pat. 3,660,438 and application Ser. No. 231,391, filed Mar. 2, 1972, said applications being in turn continuations-in-part of application Ser. No. 811,664, filed Mar. 28, 1969, now abandoned.

DETAILED DESCRIPTION

Polymeric materials such as polyolefins normally lose their physical and electrical properties during service due to oxidative, thermal and/or ultraviolet light deterioration. In order to prolong the life of the polymers, various stabilizers such as antioxidants and ultraviolet light absorbers are added to these polymers. In some instances, however, the polyolefins cannot be effectively stabilized even with the addition of such stabilizers. This usually occurs when the polyolefin is in contact with a metal, particularly copper, or contains within its composition certain metallic impurities. The metal may be in the form of copper wire when the polyolefin is used as a wire coating insulation or may be present as catalyst residues. In these cases, the metal acts as a catalyst for the decomposition processes and generally the stabilizers added to the polyolefins do not substantially retard this catalytic activity. The end result is that even though the stabilizers have been added, polyolefins decompose and lose their desirable physical properties sooner than expected.

The instant invention is concerned with polyolefin compositions which contain additives that act as antioxidants and/or metal deactivators. In other words, when the additives of this invention are incorporated into polyolefin polymers, the adverse effect of the metals on the polymer is substantially checked. The metals that may be present in polyolefins or be in contact with polyolefin are iron, nickel, cobalt, manganese, titanium, vanadium, chromium and cadmium, and especially copper. The instant composition comprises an olefin polymer such as low, medium or high density polyethylene, polypropylene or copolymers thereof and copolymers of ethylene and a minor amount (up to 10%) of a higher α-olefin such as butene-1, hexene-1, octene-1, dodecene-1 and the like, stabilized with (a) An organic hydrazine compound which is an alkylhydroxyphenylalkanoylhydrazine or an alkylhydroxybenzoylhydrazine having the formula

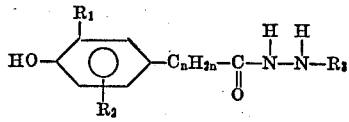

wherein

R₁ is a lower alkyl group containing from 1 to 5 carbon atoms, $R_2$ is hydrogen or a lower alkyl group containing from 1 to 5 carbon atoms, $n$ is an integer from 0 to 5, $R_3$ is hydrogen, an alkanoyl group containing 2 to 18 carbon atoms, a group represented by the formula

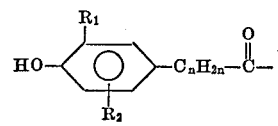

or an aroyl group having the formula

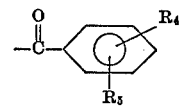

wherein $R_4$ and $R_5$ are independently hydrogen, alkyl, alkoxy or halogen where the alkyl group has up to 18 carbon atoms and (b) A phenolic antioxidant. This composition may optionally also contain other stabilizers commonly employed by those skilled in the art such as thiosynergists, phosphites, carbon black and the like.

Illustrative examples of lower alkyl groups that are substituted on the phenyl moiety are methyl, ethyl, propyl, isopropyl, butyl, t-butyl, t-amyl and the like. The preferred groups are the tertiary alkyls. Illustrative examples of the alkyl groups having longer chain groups are hexyl, hepyl, octyl, decyl, dodecyl, tetradecyl, hexadecyl, octadecyl and the like, both straight chain and branched chain. Illustrative examples of the alkanoyl groups represented by $R_3$ may contain from 1 to 30 carbon atoms and preferably from 2 to 18 carbon atoms.

The preparation of the alkylhydroxyphenylalkanoylhydrazine compounds employed in this invention is described in the copending application Ser. No. 28,048, filed on Apr. 13, 1970, and in an application filed Mar. 1, 1972.

Illustrative examples of alkylhydroxyphenyl-alkanoylhydrazines which can be employed in the instant application are listed below:

(A) N,N'-bis-β-{3,5-di-t - butyl - 4 - hydroxyphenyl) propionyl}hydrazine (B) N - stearoyl - N'-{β-(3,5 - di-t-butyl-4-hydroxyphenyl) propionyl}hydrazine (C) N - {β-(3 - ethyl - 5 - t-butyl-4-hydroxyphenyl)-propionyl}-N'-{β - (3,5-di-t-butyl - 4 - hydroxyphenyl)-propionyl}hydrazine (D) N - {β - (3,5 - di-t - butyl-4-hydroxyphenyl)propionyl}-N' - (3,5 - di - t - butyl-4-hydroxybenzoyl)hydrazine (E) N - stearoyl - N' - {β-(3,5 - diisopropyl - 4-hydroxyphenyl)-propionyl}hydrazine (F) N - stearoyl - N' - {β - (3 - methyl - 5-t-amyl-4-hydroxyphenyl)propionyl}hydrazine (G) N - benzoyl - N' - {β(3,5-di-tert-butyl-4-hydroxyphenyl) propionyl}hydrazine (H) N-p-dodecyloxybenzoyl-N'-{β(3,5-di-tert - butyl-4-hydroxyphenyl) propionyl}hydrazine (I) N - (2,4-dimethylbenzoyl) - N' - {(3,5-di-tert-butyl-4-hydroxyphenyl) propionyl}hydrazine (J) N-(2,4 - dichlorobenzoyl)N'-{β(3,5 - di-tert-butyl-4-hydroxyphenyl) propionyl}hydrazine (K) N - benzoyl - N' - {β-(3 - methyl-5-t-butyl-4-hydroxyphenyl) propionyl}hydrazine (L) N - benzoyl - N' - (3,5 - di - t-butyl-4-hydroxybenzoyl)hydrazine (M) N(p - methylbenzoyl) - N' - {β(3,5-di-t-butyl-4-hydroxyphenyl) propionyl}hydrazine (N) N(p - ethoxybenzoyl) - N' - {(3,5-di-t-amyl-4-hydroxyphenyl) propionyl}hydrazine (O) N - benzoyl - N' - {(3,5 - di - t - butyl - 4-hydroxyphenyl)-valeryl}hydrazine Illustrative examples of phenolic antioxidants that can be employed in the compositions of this invention are listed below.

(1) Phenolic compounds having the general formula

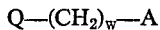

wherein
Q is

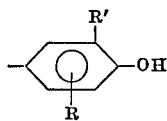

A is

or

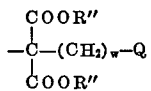

R is hydrogen or lower alkyl
R' is lower alkyl
R'' is alkyl group having from 6–24 carbon atoms
w is an integer from 0 to 4.

Illustrative examples of the compounds shown above are

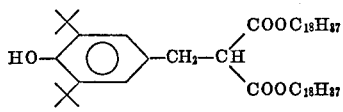

di-n-octadecyl α-(3-t-butyl-4-hydroxy-5-methylbenzyl) malonate
di-n-octadecyl α-(3-t-butyl - 4-hydroxy-5-methyl-benzyl) malonate which is disclosed in the Netherlands Patent No. 6711199, Feb. 19, 1968
di-n-octadecyl-α,α'bis-(3-t-butyl-4 - hydroxy - 5 - methylbenzyl)malonate which is disclosed in the Netherlands Patent No. 3803498, Sept. 18, 1968

(2) Phenolic compounds having the general formula

Illustrative examples of the compounds shown above are 2,6-di-t-butyl-p-cresol
2-methyl-4,6-di-t-butyphenol and the like (3) Phenolic compounds having the formula

2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methyl-
2,2'-methylene-bis[6-(1-methylcyclohexyl)-4-methylphenol]]
and the like.

(4) Phenolic compounds having the formula

R—O—Q

Illustrative examples of such compounds are 2,5-di-t-butylhydroquinone
2,6-di-t-butylhydroquinone
2,6-di-t-butyl-4-hydroxyanisole (5) Phenolic compounds having the formula

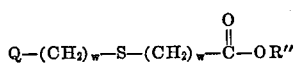

Illustrative examples of such compounds are:

octadecyl-(3,5-dimethyl-4-hydroxybenzylthio)-acetate
dodecyl-(3,5-di-t-butyl-4-hydroxybenzylthio)-propionate (6) Phenolic compounds having the formula

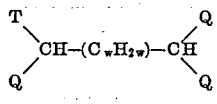

wherein T is hydrogen
R or Q as defined above.

Illustrative examples of such compounds are 1,1,3-tris(3,5-dimethyl-4-hydroxyphenyl)-propane
1,1,3-tris(5-t-butyl-4-hydroxy-2-methylphenyl)-butane
1,1,5,5-tetrakis-(3'-t-butyl-4'-hydroxy-6'-methylphenyl-n-pentane (7) Phenolic compounds having the formula

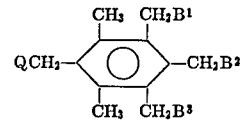

wherein $B^1$, $B^2$ and $B^3$ are hydrogen, methyl or Q, provided that when $B^1$ and $B^3$ are Q then $B^2$ is hydrogen or methyl and when $B^3$ is Q then $B^1$ and $B^2$ are hydrogen or methyl.

Illustrative examples of such compounds are:

1,4-di(3,5-di-t-butyl-4-hydroxybenzyl)-2,3,5,6-tetramethyl benzene
1,3,5-tri(3,5-di-t-butyl-4-hydroxybenzyl)-2,4,6-trimethyl-benzene (8) Phenolic compounds having the formula

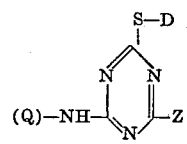

wherein
Z is NHQ, —S—D or —O—Q
D is alkyl group having from 6–12 carbon atoms or —$C_wH_{2w}$—S—R''

Illustrative examples of such compounds are 2,4-bis-(n-octylthio)-6-(3,5-di-t-butyl-4-hydroxyaniline)-1,3,5-triazine
6-(4-hydroxy-3-methyl-5-t-butylanilino)-2,4-bis-(n-octylthio)-1,3,5-triazine
6-(4-hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.

The above phenolic triazine stabilizers are more fully described in U.S. Pat. 3,255,191.

(9) Phenolic compounds having the formula

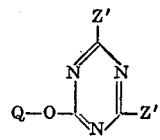

wherein Z' is —O—Q, —S—D or —S—($C_wH_{2w}$)—SD

Illustrative examples of such compounds are:

2,3-bis-(3,5-di-t-butyl-4-hydroxyphenoxy)-6-(n-octyl-thio)-1,3,5-triazine
2,4,6-tris-(4-hydroxy-3,5-di-t-butylphenoxy)-1,3,5-triazine
6-(4-hydroxy-3,5-di-t-butylphenoxy)-2,4-bis-(n-octyl-thioethylthio)-1,3,5-triazine
6-(4-hydroxy-3-methylphenoxy)-2,4-bis-(n-octylthio)-1,3,5-triazine 6-(4-hydroxy-3-t-butylphenoxy)-2,4-bis-(n-octylthio-ethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4hydroxy3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-dis-(4-hydroxy-3,5-di-t-butylphenoxy)-6-(n-dodecylthioethylthio)-1,3,5-triazine.

The above phenolic triazine stabilizers are more fully described in U.S. 3,255,191.

(10) Phenolic compounds having the formula

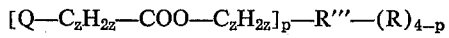

wherein
p is an integer from 2 to 4 and
R''' is a tetravalent radical selected from aliphatic hydrocarbons having from 1 to 30 carbon atoms
aliphatic mono and dithioethers having from 1 to 30 carbon atoms
aliphatic mono and diethers having from 1 to 30 carbon atoms and
z is an integer from 0 to 6.

Illustrative examples of such compounds are:

Sub-class I n-octadecyl 3-(3,5-di-t-butyl-4-hydroxyphenyl)-propionate
n-octadecyl 2-(3,5-di-t-butyl-4-hydroxyphenyl)-acetate
n-octadecyl 3,5-di-t-butyl-4-hydroxybenzoate
n-hexyl 3,5-di-t-butyl-4-hydroxyphenylbenzoate
n-dodecyl 3,5-di-t-butyl-4-hydroxyphenylbenzoate
neo-dodecyl 3-(3,5-di-t-butyl-4-hydroxyphenyl)-propionate
dodecyl β-(3,5-di-t-butyl-4-hydroxyphenyl)-propionate
ethyl α-(4-hydroxy-3,5-di-t-butylphenyl)-isobutyrate
octadecyl α-(4-hydroxy-3,5-di-t-butylphenyl)-isobutyrate
octadecyl α-(4-hydroxy-3,5-di-t-butylphenyl)propionate Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxy benzoate
2-(2-hydroxyethylthio)ethyl 3,5-di-t-butyl-4-hydroxybenzoate
2,2'-thiodiethanol bis(3,5-di-t-butyl-4-hydroxyphenyl) acetate
diethyl glycol bis-[3,5-di-t-butyl-4-hydroxyphenyl) propionate]
2-(n-octadecylthio)ethyl 3-(3,5-di-t-butyl-4-hydroxyphenyl)propionate
2,2'-thiodiethanol-bis-3-(3,5-di-t-butyl-4-hydroxyphenyl)propionate
stearamido N,N-bis-[ethylene 3-(3,5-di-t-butyl-4-hydroxyphenyl)propionate]
n-butylimino N,N-bis[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate Sub-class III 1,2-propylene glycol bis-[3-(3,5-di-t-butyl-4-hydroxyphenyl)propionate]
ethylene glycol bis-[3-(3,5-di-t-butyl-4-hydroxyphenyl)propionate]
neopentylglycol bis-[3-(3,5-di-t-butyl-4-hydroxyphenyl)propionate]
ethylene glycol bis-(3,5-di-t-butyl-4-hydroxyphenylacetate)
glycerine-1-n-octadecanoate-2,3-bis-(3,5-di-t-butyl-4-hydroxyphenylacetate
pentaethylthritol-tetrakis-3-3-(3,5-di-t-butyl-4-hydroxyphenyl)propionate
1,1,1-trimethylol ethane-tris-3-(3,5-di-t-butyl-4-hydroxyphenyl)propionate
sorbitol hexa-[3-(3,5-di-t-butyl-4-hydroxyphenyl) propionate
1,2,3-butanetriol tris-[3-(3,5-di-t-butyl-4-hydroxyphenyl)propionate]
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol-bis[(3',5'-di-t-butyl-4-hydroxyphenyl) propionate]

The above phenolic ester stabilizers of sub-classes I, II and III are more fully described in U.S. Pat. 3,330,859, Ser. No. 354,464, filed Mar. 24, 1964, and Ser. No. 359,460, filed Apr. 13, 1964, respectively.

(11) Phenolic compounds having the formula

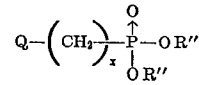

where x is an integer of 1 to 2.

Illustrative examples of such compounds are:

dioctadecyl 3,5-di-t-butyl-4-hydroxybenzylphosphonate
di-n-octadecyl 3-t-butyl-4-hydroxy-5-methyl-benzylphosphonate
di-n-octadecyl 1-(3,5-di-t-butyl-4-hydroxyphenyl)-ethanephosphonate
di-n-tetradecyl 3,5-di-t-butyl-4-hydroxybenzylphosphonate
di-n-hexadecyl 3,5-di-t-butyl-4-hydroxybenzylphosphonate
Didocosyl-3,5-di-t-butyl-4-hydroxybenzylphosphonate
Di-n-octadecyl-3,5-di-t-butyl-4-hydroxybenzylphosphonate The above di-(higher)alkyl phenolic phosphonates are more fully described in U.S. 3,281,505.

(12) Phenolic compounds having the formula

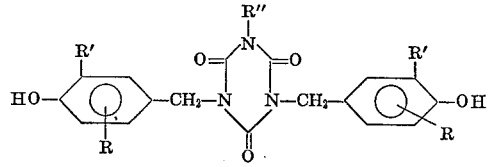

wherein R, R' and R'' are as defined above.

Illustrative examples of the compounds shown above are:

1,3,5-tris(3,5-di-t-butyl-4-hydroxybenzyl)-s-triazine-2,4,6-(1H,2H,3H)-trione
1,3-bis(3,5-di-t-butyl-4-hydroxybenzyl)5-n-hexyl-s-triazine-2,4,6-(1H,2H,3H)-trione
1,3-bis(3-t-butyl-5-methyl-4-hydroxybenzyl)-ethylene-urea

(13) Phenolic compounds having the formula

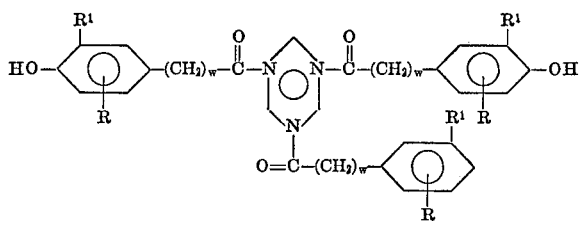

wherein R, $R^1$ and w are as defined above.

Illustrative examples of the compounds shown above are:

1,3,5-tris(3,5-di-t-butyl-4-hydroxyhydrocinnamoyl) hexahydro-s-triazine 1,3,5-tris(3-methyl-5-t-butyl-4-hydroxyhydrocinnamoyl) hexahydro-s-triazine 1,3,5-tris(2,5-di-t-butyl-4-hydroxyhydrocinnamoyl) hexahydro-s-triazine The phenolic compounds preferably employed in this invention are the compounds having the formula $$(Q\text{—}CC_zH_{2z}\text{—}COO\text{—}C_zH_{2z})_pR'''\text{—}(R)_{4-p}$$

wherein Q, R, $R'''$, p and z are defined above. The most preferred compound is pentaerithritol-tetrakis-{3-(3'-5'-di-t-butyl-4'-hydroxyphenyl)propionate}.

Compositions of this invention in the concentration of from .01 to 5% by weight of the resin and more preferably from 0.05 to 1%.

In addition to the organic hydrazine compounds and antioxidants there may also be present in the compositions of this invention synergists such as dilaurylthiodipropionate or distearylthiodipropionate phosphites, thermal stabilizers, carbon black, coloring materials, dyes, pigments, buffers, and other additives that are sometimes incorporated in the polyolefins for particular reasons.

Since the oxidation of polyolefins is slow at ambient temperatures, even in the absence of stabilizers, the testing of the effects of the metal deactivators is usually accelerated by conducting the tests at higher temperatures in order to obtain results within a reasonable time. For this reason the tests described below were conducted at elevated temperatures.

Procedure for determination of thermal stability of polypropylene copolymer with imbedded copper screen The additives as indicated in Table I below were not milled directly into a propylene-ethylene copolymer (Hercules SB271). 180 x 180 mesh/linear inch copper screen of 10 mil diameter thickness was then imbedded in the stabilized polymer by compression molding of the polymer at 420° F. to yield a 20 mil specimen. Samples were oven aged at 150° C., 140° C. and 120° C. The specimens were considered to have failed when dark yellow or green discoloration and/or cracking was noted.

TABLE I

| Example No. | Formulation | Hours to failure at— | | |
|---|---|---|---|---|
| | | 150° C. | 140° C. | 120° C. |
| 1 | 0.2% Compound A[1] | 150 | 870 | 870 |
| 2 | 0.2% Antioxidant 1 | 100 | 360 | 460 |
| 3 | 0.2% Compound A plus 0.2% Antioxidant 1. | 520 | 1,090 | [2] >2,240 |
| 4 | 0.2% Compound G[1] plus 0.2% Antioxidant 1. | 440 | 870 | +1,500 |

[1] Refers to the lettered compounds listed above.
[2] Test was terminated at this point.

NOTE.—Antioxidant 1 is pentaerythritol tetrakis-{3-(3',5'-di-t-butyl-4'-hydroxyphenyl)propionate}.

Similar stabilization obtained when Compounds A and G employed in a 0.05% concentration and Antioxidant 1 employed in a 0.1% concentration.

Similar stabilization is also obtained as shown in Table I when Compounds A and G are replaced with Compounds B, D, F, J and K and Antioxidant 1 is replaced with the following antioxidant compounds:

1,3,5-tris(3,5-di-t-butyl-4 - hydroxybenzyl) - s - triazine-2,4,6-(1H,3H,5H)-trione octadecyl β-(3,5-di-t-butyl-4-hydroxyphenyl)propionate dioctadecyl 3,5-di-t-butyl-4-hydroxybenzyl-phosphonate 2,4-bis-(n-octylthio)-6-(3-,5-di - t - butyl - 4 - hydroxyanilino)-1,3,5-triazine 2,4-bis-(3,5-di-t-butyl-4-hydroxyphenoxy) - 6 - (n-octylthio)-1,3,5-triazine diethyl-2,2-bis-(3',5'-di-t-butyl-4' - hydroxybenzyl)malonate di-n-octadecyl-2,2-bis-(3',5'-di-t-butyl-4 - hydroxybenzyl) malonate diphenyl-2,2-bis-(3',5'-di - t - butyl - 4 - hydroxybenzyl) malonate The additives as indicated in Table II below were dry blended into low density polyethylene (Union Carbide DYNK-2 resin) and extruded at 450° F. The extruded material was pelletized and then re-extruded at 450° F. onto 22 AWG untinted copper wire. Table II shows the stability of the polyethylene wire coating when oven-aged at 120° C. The specimens were considered to have failed when dark yellow or green discoloration and/or cracking was noted.

TABLE II

| Example No. | Formulation | Hours to failure at 120° C. |
|---|---|---|
| 5 | Unstabilized | 50 |
| 6 | 0.1% Antioxidant 1 | 140 |
| 7 | 0.1% Compound A plus 0.1 Antioxidant 1 | 1,00 |
| 8 | 0.2% Compound A plus 0.2 Antioxidant 1 | 1,50 |

Slightly poorer or better results are obtained when the concentration of Compound A is respectively 0.1% and 5%, and now specifically when the concentration of Antioxidant 1 is varied from 0.05 to 1%.

Procedure for determining effect of processing conditions

Polypropylene homopolymer was dry blended with the stabilizers indicated in Table III below and extruder compounded at three different temperatures. After extrusion, 10 mil copper screen was imbedded in the polymer by compression molding at 420° F. to yield 20 mil specimens. The specimens were then oven aged at 140° C. The samples were considered as having failed on first appearance of discoloration and/or cracking. The results of this test are recorded in Table III below.

TABLE III

| Example No. | Formulation | Hours to failure on oven aging at 140° C. after extrusion at— | | |
|---|---|---|---|---|
| | | 437° F. | 482° F. | 550° F. |
| 9 | 0.2% Antioxidant 1 | 160 | <70 | <70 |
| 10 | 0.2% Compound A plus 0.2% Antioxidant 1 | 1,330 | 870 | 310 |

EXAMPLE 11

Ethylene-hexene-1 copolymer (containing about 6% of hexene-1) is formulated with 0.5% of Compound C and 1.08% of thiodiethyleneglycol-bis(3,5-di-t-butyl-4-hydroxyphenyl)propionate or 1,1,1 - trimethylolethane-tris-3-(3,5-di-t-butyl - 4 - hydroxyphenyl)propionate and copper wire coated therewith as described in the procedure for the preparation of compositions for Table II. These compositions are found to be very stable under test conditions.

The invention has been described with respect to certain preferred embodiments and various modifications and variations thereof will become obvious to persons skilled in the art. It is therefore to be understood that such modifications and variations are to be included within the spirit and scope of this invention.

What is claimed:

1. A composition of matter comprising an olefin homopolymer or copolymer and
   (a) from 0.01 to 5% of an organic hydrazine compound having the formula

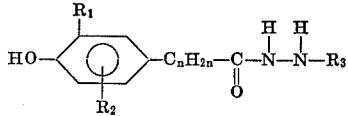

wherein $R_1$ is a lower alkyl group containing from 1 to 5 carbon atoms, $R_2$ is hydrogen or a lower alkyl group containing from 1 to 5 carbon atoms, $n$ is an integer from 0 to 5, $R_3$ is hydrogen, an alkanoyl group containing 2 to 18 carbon atoms, a group represented by the formula

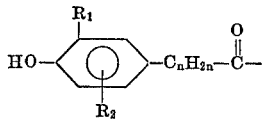

or an aroyl group having the formula

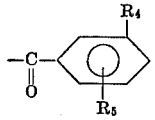

wherein $R_4$ and $R_5$ are independently hydrogen, alkyl, alkoxy or halogen where the alkyl group has up to 18 carbon atoms, and
   (b) from 0.01 to 5% of a phenolic antioxidant.

2. A composition of claim 1 having:
   (a) from 0.05 to 1% of an organic hydrazine compound, and
   (b) from 0.05 to 1% of a phenolic antioxidant, 3. A composition of claim 2 wherein $R_1$ and $R_2$ are tert-alkyl groups.

4. A composition of claim 3 wherein the phenolic antioxidant has the formula

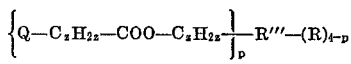

wherein Q is

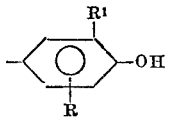

wherein

R is hydrogen or a lower alkyl group, $R^1$ is a lower alkyl group, and $R'''$ is a tetravalent radical selected from aliphatic hydrocarbons having from 1 to 30 carbon atoms, aliphatic mono and dithioesters having from 1 to 30 carbon atoms, and aliphatic mono and diethers having from 1 to 30 carbon atoms, $z$ is an integer from 0 to 6, and $p$ is an integer from 2 to 4.

5. A composition of claim 4 wherein the phenolic antioxidant is pentaerithritol tetrakis-{3-(3',5'-di-t-butyl-4'-hydroxyphenyl)propionate}.

6. A composition of claim 5 wherein the polyolefin is polyethylene, polypropylene, ethylene-propylene copolymer or higher α-olefin copolymers of ethylene.

7. A composition of claim 6 wherein the alkylhydroxyphenylalkanoyl hydrazine is N,N'-bis-{β-(3,5-di-t-butyl-4-hydroxyphenyl) propionyl}hydrazine, N-benzoyl-N'-{β-(3,5-di-t-butyl-4-hydroxyphenyl)propionyl}hydrazine or N-stearyl N'-{β-(3,5-di-t-butyl-4-hydroxyphenyl)propionyl}hydrazine.

8. A composition of claim 2, which consists essentially of
   (a) polypropylene,
   (b) N,N'-bis-{β-(3,5-di-t-butyl-4-hydroxyphenyl)propionyl}hydrazine, and
   (c) pentaerithritol tetrakis-{3-(3',5'-di-t-butyl-4'-hydroxyphenyl)propionate}.

9. A composition of claim 2, which consists essentially of
   (a) polypropylene,
   (b) N-benzoyl-N'-{β(3,5-di-t-butyl-4-hydroxyphenyl)propionyl}hydrazine and
   (c) pentaerithritol tetrakis-{3-(3',5'-di-butyl-4'-hydroxyphenyl)propionate}.

10. A composition of claim 1, which consists essentially of
    (a) polyethylene,
    (b) N,N'-bis-{β-(3,5-di-t-butyl-4-hydroxyphenyl)propionyl}hydrazine and
    (c) pentaerithritol tetrakis-{3-(3',5'-di-butyl-4'-hydroxyphenyl)propionate}.

11. A composition of claim 2, which consists essentially of
    (a) polyethylene,
    (b) N-benzoyl-N'-{β(3,5-di-t-butyl-4-hydroxyphenyl)propionyl}hydrazine, and
    (c) pentaerithritol tetrakis-{3-(3',5'-di-butyl-4'-hydroxyphenyl)propionate}.

12. A composition of claim 2, which consists essentially of
    (a) ethylene-propylene copolymer,
    (b) N,N'-bis-{β-(3,5-di-t-butyl-4-hydroxyphenyl)propionyl}hydrazine, and
    (c) pentaerithritol tetrakis-{3-(3',5'-di-butyl-4'-hydroxyphenyl)propionate}.

13. A composition of claim 2, which consists essentially of
    (a) ethylene-propylene copolymer,
    (b) N-benzoyl-N'-{β(3,5-di-t-butyl-4-hydroxyphenyl)propionyl}hydrazine, and
    (c) pentaerithritol tetrakis-{3-(3',5'-di-butyl-4-hydroxyphenyl)propionate}.

14. A composition of claim 2, which consists essentially of
    (a) a copolymer of ethylene and hexene-1 wherein hexene constitutes less than 10% of the copolymer,
    (b) N,N'-bis-{β-(3,5-di-t-butyl-4-hydroxyphenyl)propionyl}hydrazine, and
    (c) pentaerithritol tetrakis-{3-(3',5'-di-butyl-4'-hydroxyphenyl)propionate}.

15. A composition of claim 2, which consists essentially of
    (a) a copolymer of ethylene and hexene-1 wherein hexene constitutes less than 10% of the copolymer,
    (b) N-benzoyl-N'-{β(3,5-di-t-butyl-4-hydroxyphenyl)propionyl}hydrazine, and
    (c) pentaerithritol tetrakis-{3-(3',5'-di-butyl-4'-hydroxyphenyl)propionate}.

References Cited
UNITED STATES PATENTS 3,538,046   11/1970   Oertel et al. _____ 260—45.9 NC
3,489,684   1/1970    O'Shea _____ 252—403

DONALD E. CZAJA, Primary Examiner

M. J. WELSH, Assistant Examiner

U.S. Cl. X.R.

260—45.7 P, 45.7 R, 45.85 S, 45.85 P, 45.85 B, 45.9 NC, 45.9 R

Disclaimer 3,772,245.—*Martin Dexter*, Briarcliff Manor, N.Y. POLYOLEFINS STABILIZED WITH ORGANIC HYDRAZINE COMPOUNDS AND PHENOLIC ANTIOXIDANTS. Patent dated Nov. 13, 1973. Disclaimer filed Jan. 21, 1974, by the assignee, *Ciba-Geigy Corporation*.

Hereby enters this disclaimer to claim 1 of said patent.

[*Official Gazette July 8, 1975.*]